Nov. 14, 1967   C. GOODACRE   3,352,569
INDUSTRIAL TRUCKS
Filed May 12, 1966   2 Sheets-Sheet 1
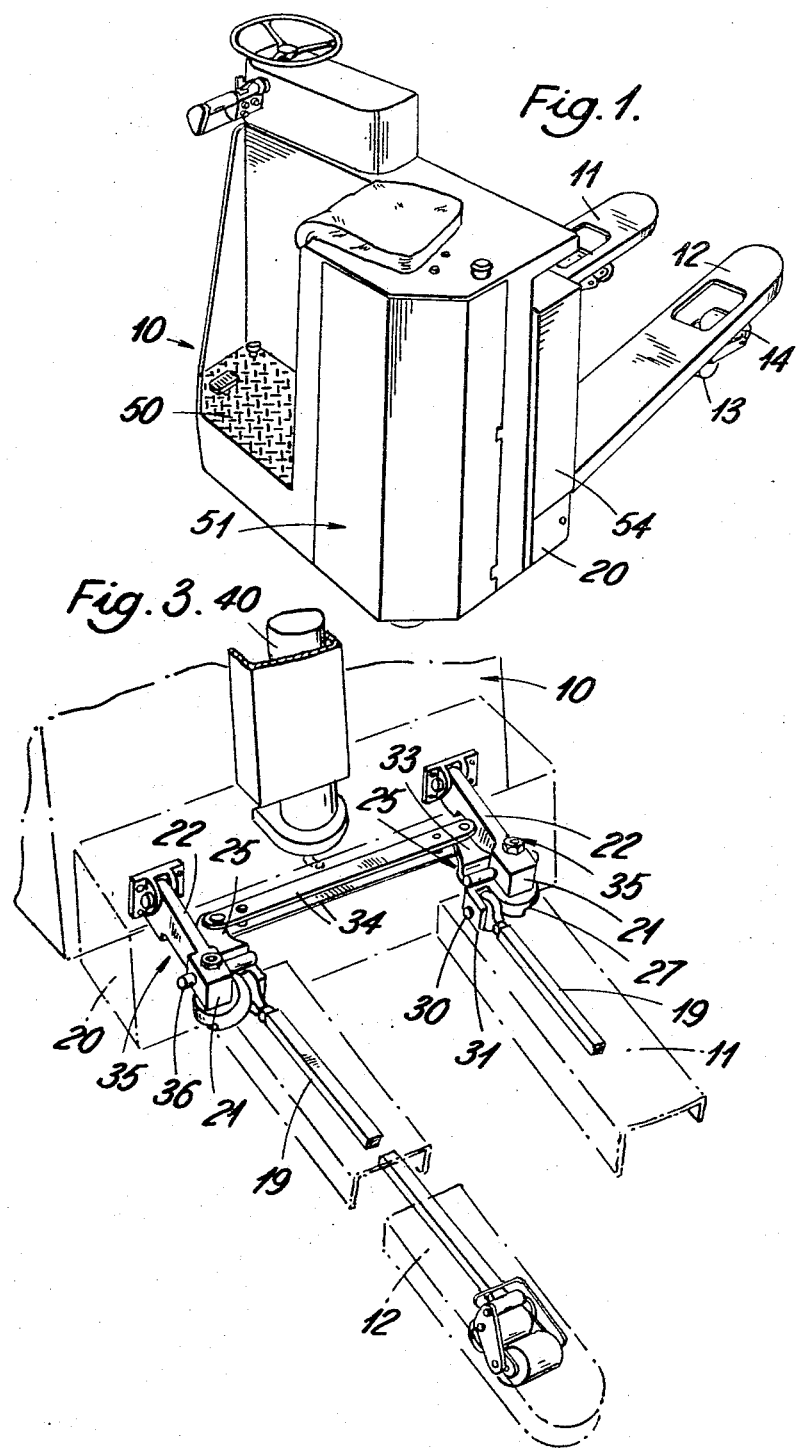

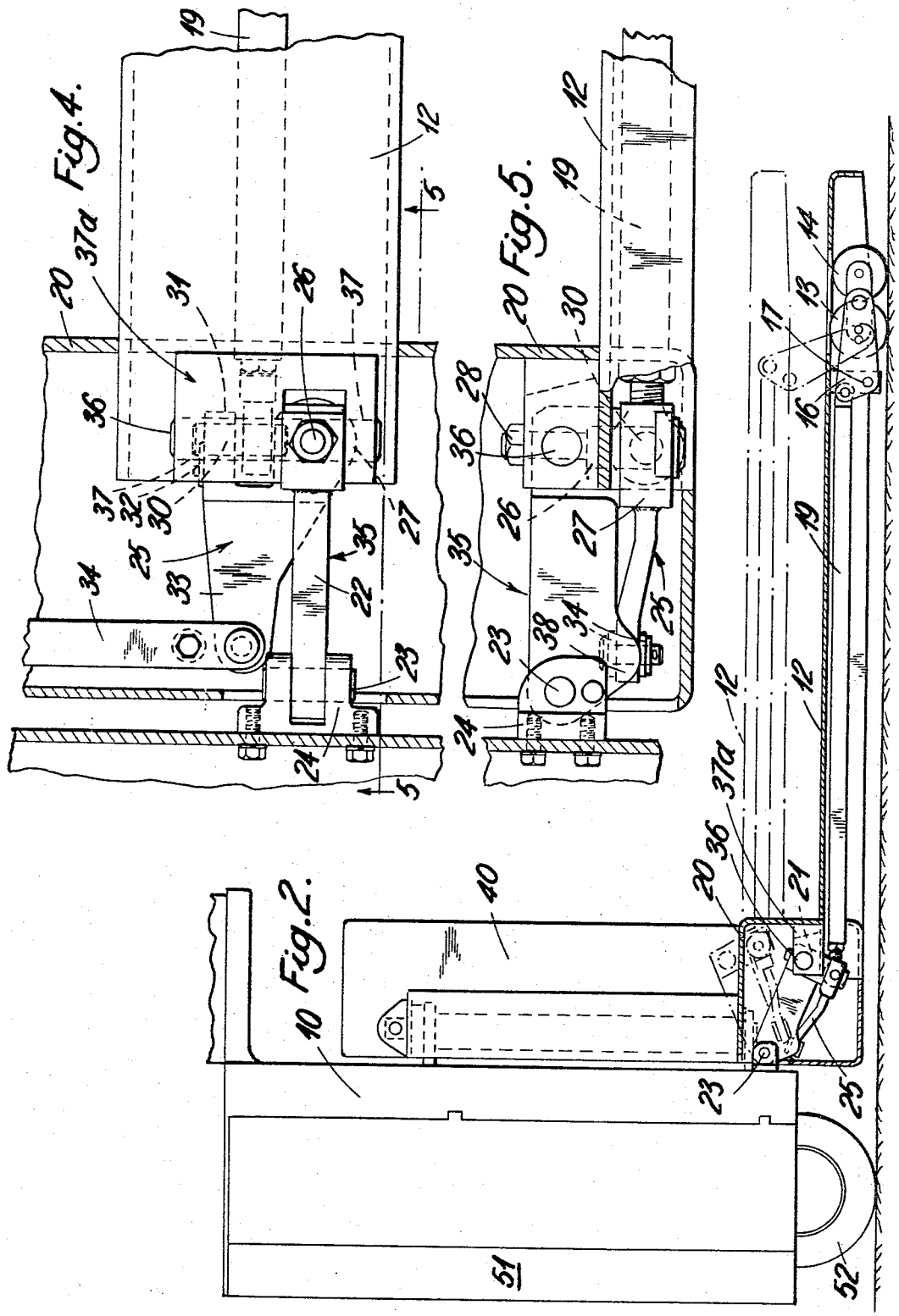

United States Patent Office 3,352,569
Patented Nov. 14, 1967

3,352,569
INDUSTRIAL TRUCKS
Cecil Goodacre, Basingstoke, England, assignor to Lansing Bagnall Limited, Basingstoke, England, a British company
Filed May 12, 1966, Ser. No. 549,573
Claims priority, application Great Britain, May 14, 1965, and May 9, 1966, 20,533/65
2 Claims. (Cl. 280—43.12)

This invention relates to industrial trucks.

According to this invention, I provide an industrial truck comprising a body portion, wheels beneath the body portion which are spaced laterally, a load-carrier device having a root portion attached to the body portion by means which permit up and down movement relative thereto, the remainder of the load-carrier device extending away from the body portion near ground level, means for raising and lowering the said root portion of the load-carrier relatively to the body portion, two wheeled ground supports spaced apart laterally at the outer part of the load-carrier and linkages on the load-carrier to which the ground supports are attached to raise and lower the said outer part of the load-carrier relatively to the ground supports when the root portion is raised and lowered, each linkage connecting operating means common to both linkages to the ground support to which the linkage is appropriated and being divided into two parts, one part being movable with, or forming a part of, the operating means and the other part being connected to the ground support and being movable independently of the first part, each linkage also being provided with a lever connecting the two parts and arranged for rocking movement by relative movement between the two parts, the two levers being interconnected by a cross link for rocking movement in unison whereby the two second mentioned parts may be moved together in the same sense by the operating means or, when the truck is on uneven ground, may move in unison independently of the operating means but in opposite senses.

In one form of the invention each first-mentioned part of each linkage comprises a bell-crank lever which is pivotally connected at its centre point to, or to a part of the truck movable in fixed relation with, the root portion of the fork or load platform structure, the lever having one arm pivotally mounted on the body portion of the truck and another arm pivotally connected to the said lever which connects the two parts of the linkage.

By way of example, a pallet truck constructed in accordance with the invention will now be described with reference to the accompanying drawings in which:

FIGURE 1 is a perspective view of the truck;

FIGURE 2 is an elevation of the truck partly in section, the near portion of the battery being omitted;

FIGURE 3 is a front perspective view of the linkage for retaining the forks of the truck horizontal on uneven ground;

FIGURE 4 is an enlarged plan view of the inner end of one of the forks of the truck shown in FIGURES 1 to 3 and of the linkage attached thereto; and FIGURE 5 is a section along line 5—5 in FIGURE 4.

With reference to the drawings, the pallet truck comprises a drive part 10 and two forks 11, 12 extending forwardly therefrom. The drive part 10 includes a stand-on platform 50 for the operator, an electrically-operated power unit 51 for driving a steerable wheel 52, stand-on controls for the power unit, a double castor wheel 53 underneath the platform 50 and an electric storage battery 54 mounted in two portions on a battery support 20 in front of the power unit 51 and the platform 50. However this invention is not concerned with the drive part 10 but is restricted to mechanism associated with the forks 11, 12. The following description will thus be limited thereto, the remainder of the pallet truck being constructed, as more fully described in the specification of our British patent application No. 20,406/65.

The forks 11, 12 are capable of movement in a vertical plane parallel to the longitudinal axis of the truck. The forks 11, 12 are each provided with a pair of trail wheels 13, 14 located near the outer ends of the forks. Each pair of trail wheels 13, 14 is carried on a roller carriage 15, the centre of which is supported on a bell-crank lever 16 pivoted by a pin 17 in bearings 18 secured to the associated fork. The bell-crank lever 16 is connected to a push-rod 19 within the fork which push-rod extends to the support 20 for the battery 54. Operation of this push-rod 19 causes the bell-crank lever 16 to swing about its pivotal mounting and to raise or lower the roller carriage 15 and the trail wheels 13, 14 with respect to the fork. As the trail wheels are resting on the ground this movement serves to respectively lower or lift the outer ends of the forks.

The truck is also provided with a hydraulic lift jack 40 for raising and lowering the support 20 for the battery 54 together with the inner ends of the forks 11, 12 relative to the body of the truck, which body is constituted by the section of the truck comprising the power unit 51 and the platform 50. During raising of the inner end of the forks 11, 12 and the support 20 by the jack 40, the push-rods 19 are operated to lower the trail wheels 13, 14 thereby lifting the outer ends of the forks and hence maintaining the forks substantially horizontal. The means for operating each push-rod comprises a bell-crank lever or link 35 (hereinafter called a link) which link is provided with arms 21, 22 and is pivotally mounted on a pin 36 which pin is mounted in a pair of bearings 37 provided by a block 37a secured to the inner end of the adjacent fork (see FIGURE 5). The link 35 is thus raised and lowered, together with the support 20 for the battery 54 and the inner ends of the forks 11, 12, by the jack 40. The link 35 is also transposed longitudinally of the truck, the end of the arm 21 being indirectly pivotally connected to the inner end of the associated push-rod 19 and the end of the arm 22 being pivotally connected by means of a pivot pin 23 to a bracket 24 fixed on the stationary body of the truck. Raising and lowering of the battery support 20 and the inner ends of the forks 11, 12 by the jack 40 will thus cause the link 35 to pivot about the pin 23 and both extreme positions of the link are shown in FIGURE 2.

Means are also provided whereby the trail wheels 13, 14 of one fork can be raised (or lowered) when the trail wheels of the other fork are lowered (or raised), which means will now be described. The indirect pivot means between the arm 21 of each link 35 and the associated push-rod 19 will also be described.

Mounted underneath each link 35 is a Y-shaped rearwardly extending lever 25. The arm 27 of this lever 25 is pivotally mounted to the underside of the arm 21 of the link 35 by means of a substantially vertical pivot pin 26 extending into and through the arm 21, the head of the pin being underneath the arm 27 of the lever 25 and the pin being held in position by a nut 28.

The lever 25 is also provided with a horizontal spindle 30 extending between bores in the arm 27 of the lever and the other arm 31 of the lever. Mounted on this spindle 30 is the free end of the associated push-rod 19. The push-rod is thereby pivotally mounted on the lever 25 and indirectly pivotally connected to the arm 21 of the cranked link 35. The spindle 30 is held against longitudinal movement by a detent 32 engaging in a slot in the spindle.

The stems or arms 33 of the lever 25 are pivotally connected to opposite ends of a pair of spaced apart connecting rods or bars 34. Hence longitudinal movement of one of the push-rods in one direction will pivot the lever 25 on which it is mounted about the pivot pin 26 and will simultaneously effect longitudinal movement of the bars 34, pivotal movement of the lever 25 associated with the other push-rod and longitudinal movement of the other push-rod in the opposite direction to that in which the first-mentioned push-rod is moved. Outward movement of each arm 25 is restricted by a downwardly projecting lug 38 on the arm 22 of the corresponding link 35 (see FIGURE 2).

The truck may thus be operated over uneven ground in such a way that one pair of trail wheels is caused to rise or fall relatively to the other. When one pair of trail wheels 13, 14 rests on elevated ground that pair of trail wheels rises relatively to the fork 11 or 12, and causes the associated bell-crank lever 16 to rotate about its pivot and operate the corresponding push-rod 19. As described above, operation of one push-rod 19 will cause opposed movement of the other push-rod and hence, in this case, cause downward movement of the other pair of trail wheels. The forks are thus maintained substantially horizontal.

The invention is not limited to the details of the above description. For example, the truck could be a stillage truck, with a platform instead of forks 11, 12.

I claim:

1. An industrial truck comprising a body portion, wheels beneath the body portion which are spaced laterally, a load-carrier device having a root portion attached to the body portion by means which permit up and down movement relative thereto, the remainder of the load-carrier device extending away from the body portion near ground level, means for raising and lowering the said root portion of the load-carrier relatively to the body portion, two wheeled ground supports spaced apart laterally at the outer part of the load-carrier and linkages on the load-carrier to which the ground supports are attached to raise and lower the said outer part of the load-carrier relatively to the ground supports when the root portion is raised and lowered, each linkage connecting operating means common to both linkages to the ground support to which the linkage is appropriated and being divided into two parts, one part being movable with, or forming a part of, the operating means and the other part being connected to the ground support and being movable independently of the first part, each linkage also being provided with a lever connecting the two parts and arranged for rocking movement by relative movement between the two parts, the two levers being interconnected by a cross link for rocking movement in unison whereby the two second mentioned parts may be moved together in the same sense by the operating means or, when the truck is on uneven ground, may move in unison independently of the operating means but in opposite senses.

2. A truck as claimed in claim 1 in which each first-mentioned part of each linkage comprises a bell-crank lever which is pivotally connected at its centre point to, or to a part of the truck movable in fixed relation with, the root portion of the fork or load platform structure, the lever having one arm pivotally mounted on the body portion of the truck and another arm pivotally connected to the said lever which connects the two parts of the linkage.

References Cited

UNITED STATES PATENTS

| 2,940,767 | 6/1960 | Quayle | 280—43.12 |
| 3,143,358 | 8/1964 | Du Broff | 280—43.12 |
| 3,181,640 | 5/1965 | Goodacre et al. | 280—43.12 X |
| 3,261,617 | 7/1966 | Becker et al. | 280—43.12 |

BENJAMIN HERSH, Primary Examiner.

C. C. PARSONS, Assistant Examiner.